United States Patent
Locker et al.

(10) Patent No.: US 9,516,696 B2
(45) Date of Patent: Dec. 6, 2016

(54) CONTEXT AWARE DEVICE DISCONNECTION

(75) Inventors: Howard Locker, Cary, NC (US); Daryl Cromer, Cary, NC (US); John Miles Hunt, Raleigh, NC (US); John Weldon Nicholson, Holly Springs, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 325 days.

(21) Appl. No.: 13/306,280

(22) Filed: Nov. 29, 2011

(65) Prior Publication Data

US 2013/0138797 A1 May 30, 2013

(51) Int. Cl.
G06F 15/173 (2006.01)
H04W 76/06 (2009.01)
H04W 4/02 (2009.01)
H04L 29/08 (2006.01)

(52) U.S. Cl.
CPC .......... *H04W 76/06* (2013.01); *H04L 67/143* (2013.01); *H04W 4/021* (2013.01); *H04W 4/027* (2013.01)

(58) Field of Classification Search
CPC .. H04W 8/22; H04W 48/04; H04M 1/72577
USPC ....... 709/221–226, 205, 219, 227; 340/3.42; 370/229; 726/1; 455/418, 419, 466, 455/557
See application file for complete search history.

(56) References Cited

U.S. PATENT DOCUMENTS

| | | | |
|---|---|---|---|
| 6,308,213 B1 * | 10/2001 | Valencia ....................... | 709/229 |
| 6,542,463 B1 * | 4/2003 | Heeke ............................ | 370/230 |
| 6,983,306 B1 * | 1/2006 | Sameshima et al. .......... | 709/205 |
| 7,257,108 B2 | 8/2007 | Cheston | |
| 7,586,867 B2 * | 9/2009 | Lin ................................ | 370/321 |
| 7,882,240 B2 * | 2/2011 | Dickens et al. .............. | 709/227 |
| 8,427,942 B2 * | 4/2013 | Kim et al. ..................... | 370/229 |
| 8,756,304 B2 * | 6/2014 | Leacock et al. .............. | 709/223 |
| 2005/0288860 A1 * | 12/2005 | Pair ........................ | G01C 21/36 701/431 |
| 2006/0277275 A1 * | 12/2006 | Glaenzer ....................... | 709/219 |
| 2007/0030348 A1 * | 2/2007 | Snyder .......................... | 348/135 |
| 2009/0325566 A1 * | 12/2009 | Bell ......................... | H04W 8/22 455/419 |
| 2010/0216509 A1 * | 8/2010 | Riemer ............. | H04M 1/72577 455/557 |
| 2011/0009107 A1 * | 1/2011 | Guba ........................ | G08G 1/20 455/418 |
| 2011/0012729 A1 * | 1/2011 | Hess ......................... | 340/539.13 |
| 2011/0143786 A1 * | 6/2011 | Fan ........................ | H04W 48/04 455/466 |
| 2012/0274440 A1 * | 11/2012 | Meadows et al. ........... | 340/3.42 |
| 2013/0051299 A1 * | 2/2013 | Hua et al. ..................... | 370/312 |
| 2013/0091537 A1 * | 4/2013 | Parla et al. ...................... | 726/1 |

FOREIGN PATENT DOCUMENTS

| | | |
|---|---|---|
| CN | 1606861 A | 4/2005 |
| CN | 101258764 A | 9/2008 |
| CN | 101657807 A | 2/2010 |

* cited by examiner

*Primary Examiner* — Dustin Nguyen
(74) *Attorney, Agent, or Firm* — Ference & Associates LLC

(57) ABSTRACT

Systems, methods and products directed toward context aware device disconnection are provided herein. One aspect includes obtaining one or more physical measurements of an information handling device connected to one or more external systems, the one or more physical measurements being measured using one or more physical characteristic measurement elements; analyzing the one or more physical measurements using one or more policy settings configured in one or more disconnection policies stored on the information handling device; and initiating one or more disconnection events responsive to the one or more physical measurements matching the one or more policy settings. Other embodiments are described herein.

12 Claims, 5 Drawing Sheets

CONTEXT AWARE DEVICE DISCONNECTION

BACKGROUND

Mobile devices, such as smartphones and tablet computing devices, are increasingly used to interact with external electronic products. This is the direct result of the continual development of applications and hardware that facilitate advanced interactions between mobile devices and an increasing number of computing devices and other electronic products. For example, a smartphone may interface with a digital projector and control the device and provide image data. Mobile devices are currently able to communicate with other electronic systems through multiple connection methods, including wireless protocols such as Wi-Fi and physical connections such as Universal Serial Bus (USB) and Ethernet.

BRIEF SUMMARY

In summary, one aspect provides an information handling device comprising: one or more processors; a memory in operative connection with the one or more processors; wherein, responsive to execution of program instructions stored in said memory, the one or more processors are configured to: connect the information handling device to one or more external systems; obtain one or more physical measurements of the information handling device using one or more physical characteristic measurement elements; analyze the one or more physical measurements using one or more policy settings configured in one or more disconnection policies stored on the information handling device; and initiate one or more disconnection events responsive to the one or more physical measurements matching the one or more policy settings.

Another aspect provides a method comprising: obtaining one or more physical measurements of an information handling device connected to one or more external systems, the one or more physical measurements being measured using one or more physical characteristic measurement elements; analyzing the one or more physical measurements using one or more policy settings configured in one or more disconnection policies stored on the information handling device; and initiating one or more disconnection events responsive to the one or more physical measurements matching the one or more policy settings.

A further aspect provides a program product comprising: a storage medium having program code embodied therewith, the program code comprising: program code configured to obtain one or more physical measurements of an information handling device connected to one or more external systems, the one or more physical measurements being measured using one or more physical characteristic measurement elements; program code configured to analyze the one or more physical measurements using one or more policy settings configured in one or more disconnection policies stored on the information handling device; and program code configured to initiate one or more disconnection events responsive to the one or more physical measurements matching the one or more policy settings.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
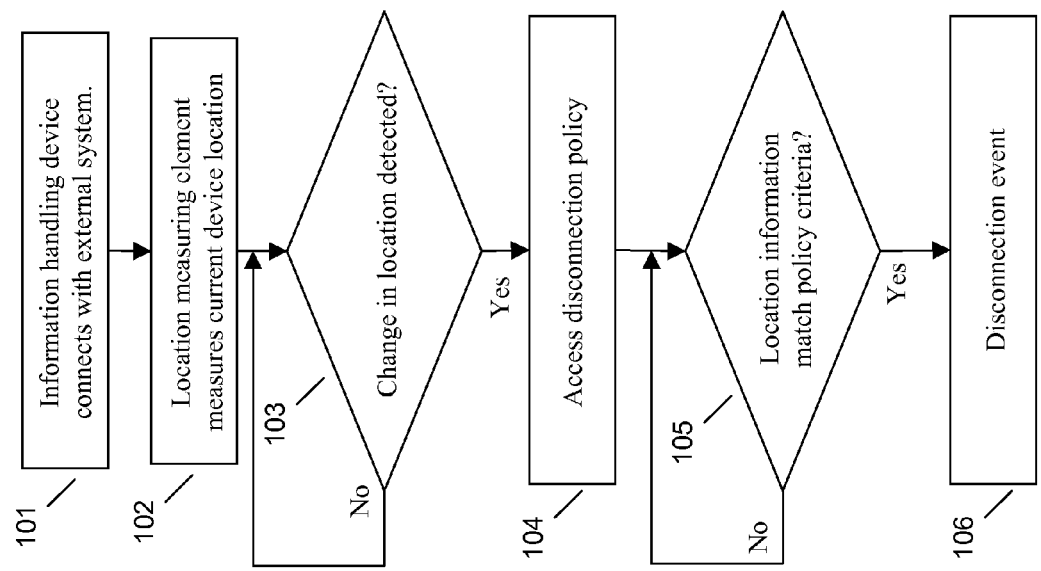
FIG. 1 provides an example process for location-based connection termination according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Disintegrated computing involves a technological environment wherein users carry a minimum mobile information handling device load (pertaining to both the size and the number of devices) capable of interacting with other computing devices, peripherals, and electronic products. This interaction operates to extend mobile information handling device capabilities and to create a more complete computing experience wherein a user may communicate with a wide range of electronic products through a single mobile device. For example, a user may carry a smartphone that is capable of interacting with a high definition television (HDTV) at home and a laptop and digital projector located at his place of employment. The external devices accessible through a mobile information handling device may be public or private, and may additionally be owned by others.

A mobile information handling device may connect with an external device using a wide range of existing communication protocols. For example, wireless protocols such as Bluetooth® and Wi-Fi or physical connections such as USB, FireWire®, Thunderbolt®, HDMI, DisplayPort, and Ethernet. BlueTooth is a registered trademark of Bluetooth SIG, Inc. FireWire is a registered trademark of Apple Inc. According to existing technology, mobile devices primarily connect with external devices in close proximity, such as those located within a personal area network (PAN), physically connected through an Ethernet or FireWire® cable. In these situations, a realistic maximum distance between devices ranges from a few feet for wired connections to thirty feet for wireless connections (e.g., the range of Bluetooth® wireless technology). In addition, certain wireless connections, such as PAN connections, can only be established between devices in the same room, as these connections cannot be maintained through barriers such as walls. As such, when a mobile device is moved a certain distance away from a connected device or into another room, the connection is terminated without any user interaction. The connection termination occurs simply because the connection cannot be maintained unless the devices are within a certain local distance and/or line of sight of each other.

An increasing number of devices are able to establish connections over greater distances. For example, a mobile device may connect with a HDTV or a printer across an IP network, such as a WAN, LAN, or WLAN, wherein the devices do not need to be physically close to each other. These long-range connections provide for more flexibility and allow a mobile device to maintain a connection when a user is no longer in close proximity to the connected external device.

However, the long-range connectivity may produce certain unintended consequences wherein a user may no longer want to be connected to one or more devices after a period of interaction is complete. For example, a user may connect a tablet computing device to a HDTV through a WLAN in order to display certain images on the HDTV during a presentation at a certain location, such as a conference room in a corporate office building. After the presentation, the user leaves the conference room and opens a personal, confidential document on the tablet computing device in a second location located several floors above the conference room. However, the tablet computing device and the HDTV may maintain their connection over a large distance because they are connected through an IP network. As such, because the user did not disconnect the tablet computing device from the HDTV, the personal, confidential document may also be displayed on the HDTV in the conference room.

This situation described immediately above may also occur with many other devices, such as a network printer, digital projector, or another computing device. For example, a user may connect a mobile device to a first printer located in a common office area through a WLAN to print a certain document. Later, the user may attempt to print a personal email from the mobile device at a second printer located in his office and also available through the WLAN. However, if the user did not directly disconnect from the first printer, the personal email may print at the first printer located in the common office area.

Until recently, when a user was no longer in close proximity with a connected device, it was likely that the devices no longer connected. For example, if a mobile device was connected to a digital projector in a conference room through Bluetooth®, FireWire®, HDMI, or DisplayPort, then the user could assume that the mobile device was no longer connected when removed from the conference room or the physical connection was removed. However, advances in network technology, information handling devices, and other electronic products make it possible to initiate and maintain connections over very large distances. Certain devices have attempted to solely utilize one or more timeout mechanisms to terminate a connection, for example, responsive to expiration of a predetermined time period or after a certain period of inactivity. Nonetheless, such time-based connection termination functions have proved ineffective in real-world situations, as they result in unintended connection terminations and require users to reconfigure settings for each situation and connected device.

Embodiments provide one or more policies for managing connection termination between an information handling device and another system based on one or more physical characteristics of the information handling device. According to embodiments, relevant physical characteristics of an information handling device may comprise a location, motion, direction of motion, or some combination thereof.

An information handling device configured according to embodiments may be comprised of or be in communication with elements configured to measure certain physical characteristics of the device. The information handling device compares the physical characteristics to one or more disconnection policies and activates a disconnection event if the physical characteristic matches a setting in the one or more disconnection policy. A disconnection policy may be configured according to embodiments to be comprised of one or more policy settings, which provide specific disconnection policies, such as policies pertaining to time, distance, devices, connections, and disconnection events. A non-limiting example provides that a smartphone may have an element for determining geographic location and may terminate a connection with a device responsive to moving a certain distance away from a connected system. For example, a module or application may operate on an information handling device that receives physical characteristic measurements as input and continuously or at predetermined intervals accesses device disconnection policies to determine whether one or more policies have been triggered.

Referring to FIG. 1, therein is provided an example process for location-based connection termination according to an embodiment. An information handling device connects with an external system through a network 101 (e.g., WAN, WLAN). According to embodiments, an information handling device may be comprised of any information handling device capable of carrying out embodiments provided herein, including, but not limited to, a smartphone, tablet or slate computing device, personal digital assistant (PDA), e-reader, and laptop computer. In addition, embodiments may be configured to operate with any external system capable of establishing a connection with information handling devices arranged according to embodiments. Non-limiting examples of external systems include information handling devices, networks, and external systems such as televisions (e.g., HDTVs), printers, digital projectors, and integrated car entertainment (ICE) devices.

A location measuring element on the information handling device measures the current location of the information handling device 102. According to embodiments, the location measuring element may be any element capable of determining the location of the information handling device in a manner suitable for carrying out embodiments described herein. A non-limiting example provides that the location information may be geographic location data or a location within a specific system, for example, a network of devices configured within a structure (e.g., office building or manufacturing facility). Illustrative and non-restrictive examples of location measuring elements include a global positioning system (GPS) receiver, electronic compass, and electronic tags, such as the RFID tags used in combination with the network of location aware wall-plates in U.S. Pat. No. 7,257,108, entitled "Determining the Physical Location of Resources on and Proximate to a Network," the contents of which are incorporated by reference as if fully set forth herein. According to embodiments, device physical characteristics may be measured based on certain settings, including continuously, responsive to detected changes (e.g., device connects to external system, detected movement, etc.), or at predetermined time intervals.

If a change in location is measured by the location measurement element 103, the information handling device accesses the disconnection policy 104. According to embodiments, the disconnection policy may be configured to provide one or more policies for terminating a connection based on the location of the information handling device. Non-restrictive examples provide that a policy may be based on the distance traveled by the information handling device or the geographic location of the information handling device. For example, a policy may be configured to terminate a connection if the information handling device travels a certain distance away from the connected system (e.g., thirty feet, one hundred yards, one mile, etc.). In another example, a connection may be terminated if the information handling device moves to one or more specified geographic locations, such as outside of a certain area (e.g., outside of an office building). In addition, the information handling device may have different policies, including, but not limited to, policies based on particular devices, locations, time of day, connection type, active applications, and device activity.

If the location information matches connection termination criteria specified in the disconnection policy 105, then a disconnection event may be triggered on the information handling device 106. According to embodiments, a disconnection event may be configured in the disconnection policy and may include providing a warning to the user, for example, that the device is near a disconnection threshold, prompting the user as to whether they would like to continue or disconnect, terminating the connection, maintaining the connection, or combinations thereof.

Figure 2:
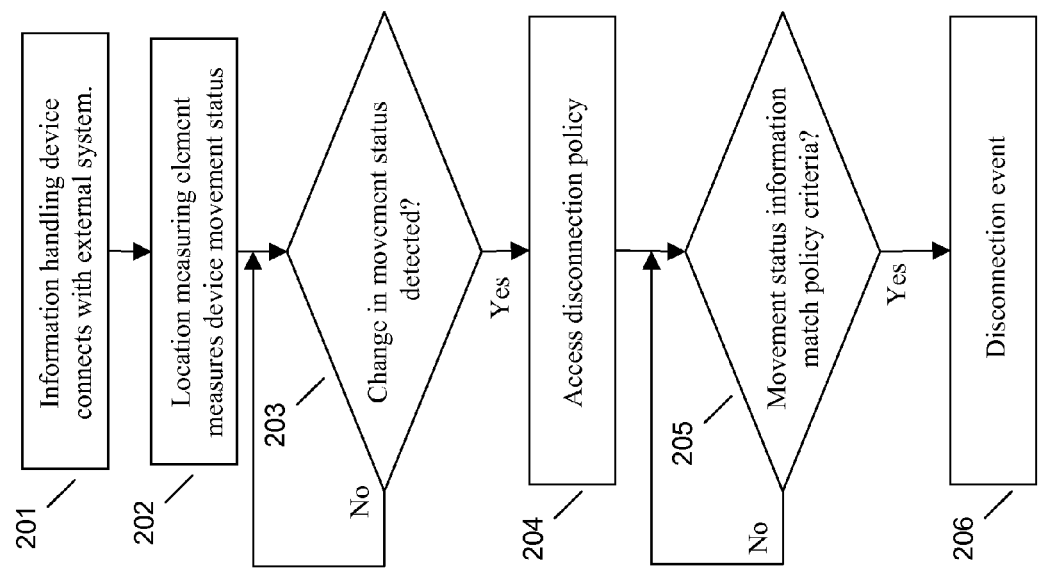
FIG. 2 provides an example process for movement-based connection termination according to an embodiment.

FIG. 2 provides an example process for movement-based termination according to an embodiment. An information handling device connects with an external system through a network 201 (e.g., an IP network). A movement measuring element on the information handling device measures the movement status of the information handling device 202. According to embodiments, the movement status of the information handling device may comprise one or more physical characteristics of the information handling device indicating the level of movement of the device. Illustrative and non-restrictive examples include acceleration as measured by an integral accelerometer sensor, an amount of movement within a certain period of time (e.g., movement within an x, y, z plane; constant movement for longer than thirty seconds, indicating, for example, that a user is walking with the device), direction determined using a compass sensor, or combinations thereof.

If a change in movement is measured by the movement measurement element 203 (e.g., the amount of motion increases or the device acceleration increases), the information handling device accesses the disconnection policy 204. If the movement information matches termination connection criteria specified in the disconnection policy 205 (e.g., device movement exceeds a threshold), then a disconnection event may be triggered on the information handling device 206.

Figure 3:
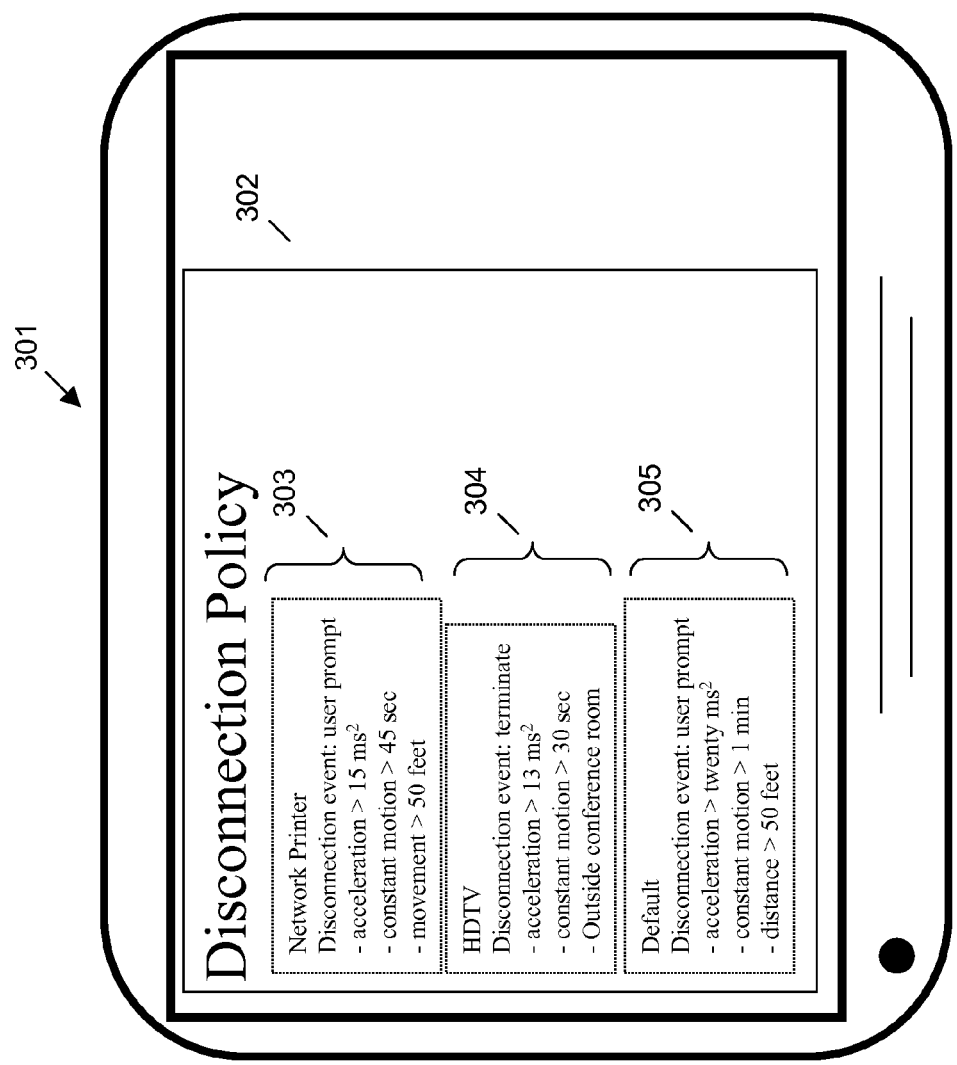
FIG. 3 provided an example disconnection policy configured according to an embodiment.

Referring to FIG. 3, therein is provided an example disconnection policy configured according to an embodiment. In the example of FIG. 3, the information handling device 301 is a tablet computing device having a disconnection policy 302 configured for different external systems and physical characteristics. As shown in FIG. 3, a policy setting is configured for a network printer 303, wherein a user prompt disconnection event is triggered if acceleration is greater than fifteen $m/s^2$, movement is detected for longer than forty-five seconds, or the device is moved greater than thirty feet from the network printer. Another policy setting is provided for a HDTV 304 that provides for connection termination if acceleration is greater than thirteen $m/s^2$, movement is detected for longer than thirty seconds, or the device is moved outside of the conference room where the HDTV is located. FIG. 3 additionally provides for a default policy setting 305 for non-specified devices. The default policy setting 306 provides for a user prompt if acceleration is greater than twenty $m/s^2$, movement is detected for longer than one minute, or the device is moved greater than fifty feet. Although certain disconnection policy values relating to acceleration, constant motion, and distance are described in FIG. 3, embodiments are not limited to these policy settings, disconnection events, values or ranges of values, or combinations thereof, as these are only meant to serve as part of an example.

Figure 4:
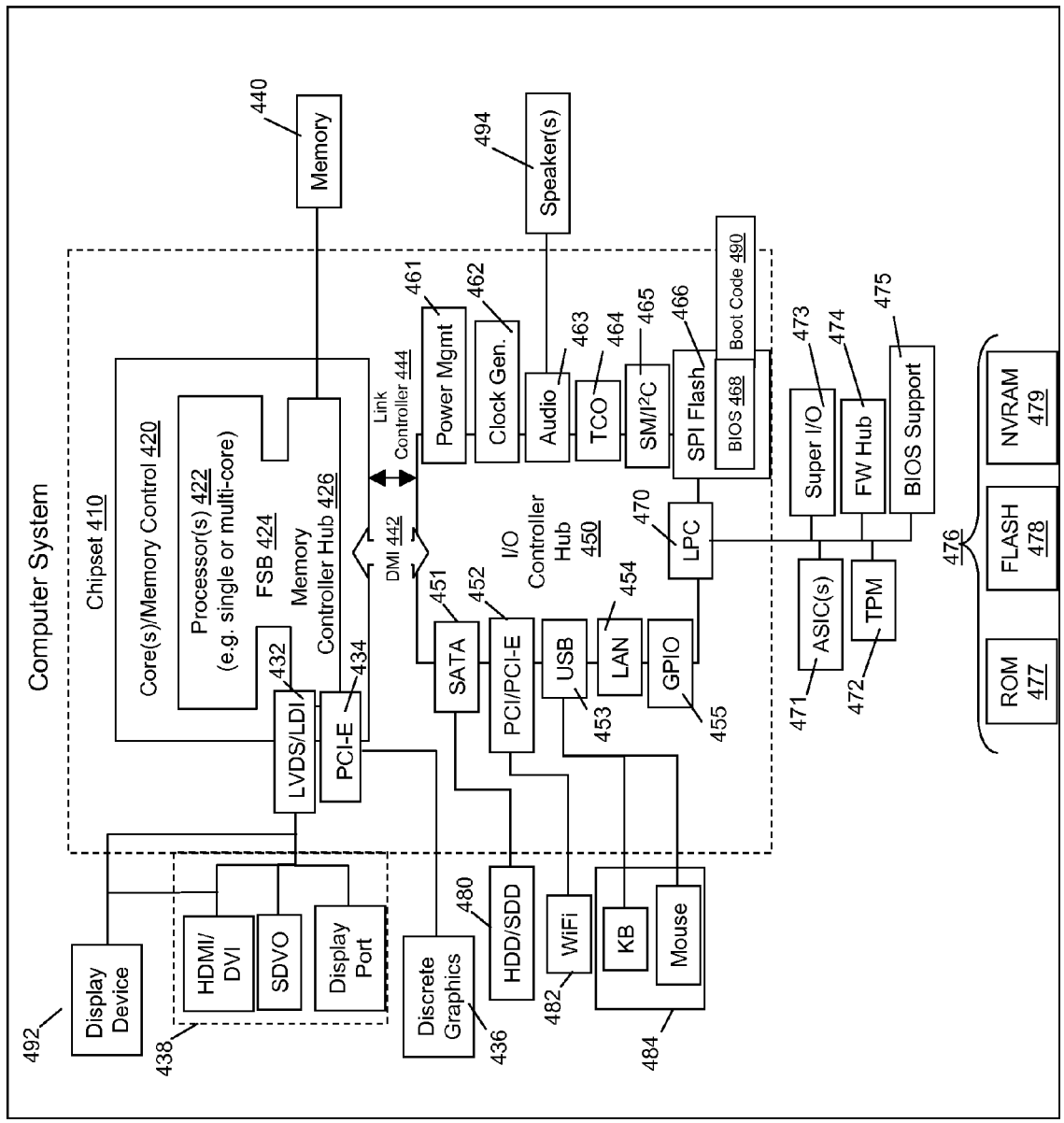
FIG. 4 illustrates an example circuitry of an information handling device system.

While various other circuits, circuitry or components may be utilized, FIG. 4 depicts a block diagram of one example of information handling device circuits, circuitry or components. The example depicted in FIG. 4 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 4.

The example of FIG. 4 includes a so-called chipset 410 (a group of integrated circuits, or chips, that work together, chipsets) with an architecture that may vary depending on manufacturer (for example, INTEL, AMD, ARM, etc.). The architecture of the chipset 410 includes a core and memory control group 420 and an I/O controller hub 450 that exchanges information (for example, data, signals, commands, et cetera) via a direct management interface (DMI) 442 or a link controller 444. In FIG. 4, the DMI 442 is a chip-to-chip interface (sometimes referred to as being a link between a "northbridge" and a "southbridge"). The core and memory control group 420 include one or more processors 422 (for example, single or multi-core) and a memory controller hub 426 that exchange information via a front side bus (FSB) 424; noting that components of the group 420 may be integrated in a chip that supplants the conventional "northbridge" style architecture.

In FIG. 4, the memory controller hub 426 interfaces with memory 440 (for example, to provide support for a type of RAM that may be referred to as "system memory" or "memory"). The memory controller hub 426 further includes a LVDS interface 432 for a display device 492 (for example, a CRT, a flat panel, a projector, et cetera). A block 438 includes some technologies that may be supported via the LVDS interface 432 (for example, serial digital video, HDMI/DVI, display port). The memory controller hub 426 also includes a PCI-express interface (PCI-E) 434 that may support discrete graphics 436.

In FIG. 4, the I/O hub controller 450 includes a SATA interface 451 (for example, for HDDs, SDDs, 480 et cetera), a PCI-E interface 452 (for example, for wireless connections 482), a USB interface 453 (for example, for input devices 484 such as a digitizer, keyboard, mice, cameras, phones, storage, other connected devices, et cetera.), a network interface 454 (for example, LAN), a GPIO interface 455, a LPC interface 470 (for ASICs 471, a TPM 472, a super I/O 473, a firmware hub 474, BIOS support 475 as well as various types of memory 476 such as ROM 477, Flash 478, and NVRAM 479), a power management interface 461, a clock generator interface 462, an audio interface 463 (for example, for speakers 494), a TCO interface 464, a system management bus interface 465, and SPI Flash 466, which can include BIOS 468 and boot code 490. The I/O hub controller 450 may include gigabit Ethernet support.

The system, upon power on, may be configured to execute boot code 490 for the BIOS 468, as stored within the SPI Flash 466, and thereafter processes data under the control of one or more operating systems and application software (for example, stored in system memory 440). An operating system may be stored in any of a variety of locations and accessed, for example, according to instructions of the BIOS 468. As described herein, a device may include fewer or more features than shown in the system of FIG. 4.

Figure 5:
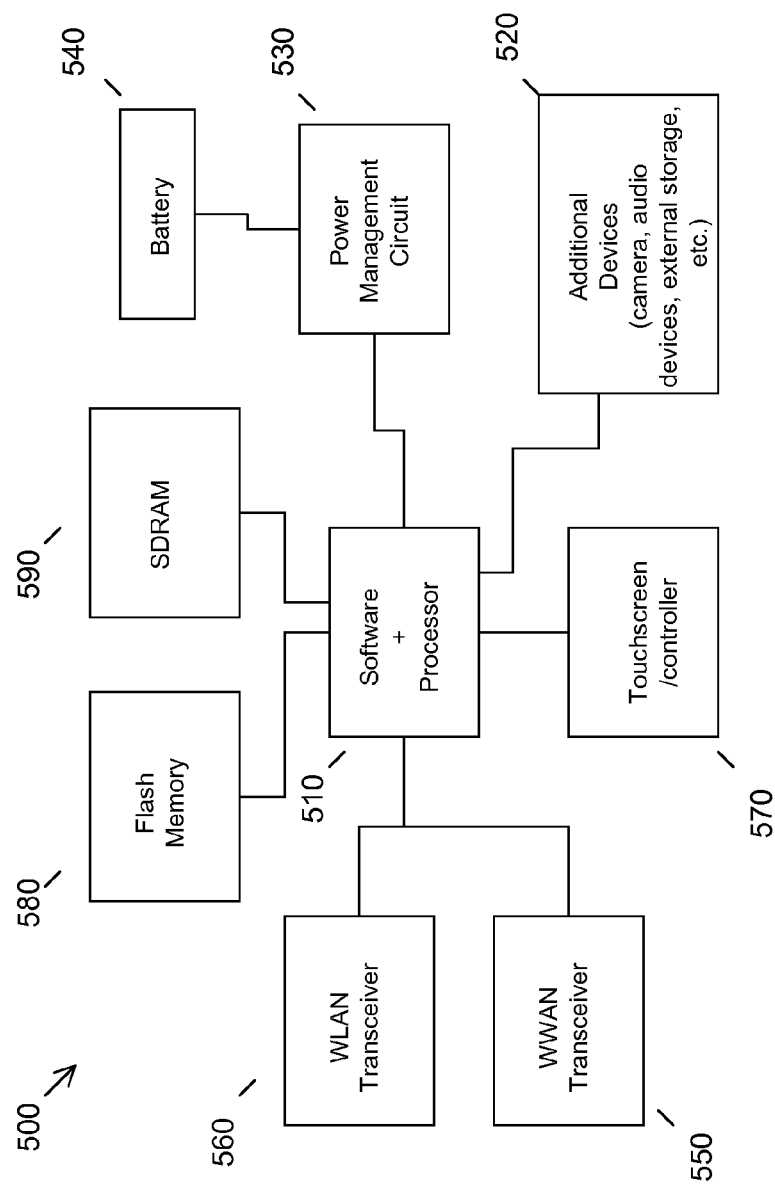
FIG. 5 illustrates another example circuitry of an information handling device system.

For example, referring to FIG. 5, with regard to smartphone and/or tablet circuitry 500, an example includes INTEL, AMD, and ARM based systems (systems on a chip [SoC]) design, with software and processor(s) combined in a single chip 510. Internal busses and the like depend on different vendors, but essentially all the peripheral devices (520) may attach to a single chip 510. In contrast to the circuitry illustrated in FIG. 5, the tablet circuitry 500 combines the processor, memory control, and I/O controller hub all into a single chip 510. Also, INTEL, AMD, and ARM SoC based systems 500 do not typically use SATA or PCI or LPC. Common interfaces for example include SDIO and I2C. There are power management chip(s) 530, which manage power as supplied for example via a rechargeable battery 540, which may be recharged by a connection to a power source (not shown), and in the at least one design, a single chip, such as 510, is used to supply BIOS like functionality and DRAM memory.

INTEL, AMD, and ARM SoC based systems 500 typically include one or more of a WWAN transceiver 550 and a WLAN transceiver 560 for connecting to various networks, such as telecommunications networks and wireless base stations. Commonly, an INTEL, AMD, and ARM SoC based system 500 will include a touchscreen 570 for data input and display. INTEL, AMD, and ARM SoC based systems 500 also typically include various memory devices, for example flash memory 580 and SDRAM 590.

Embodiments may be implemented in one or more information handling devices configured appropriately to execute program instructions consistent with the functionality of the embodiments as described herein. In this regard, FIGS. 4-5 illustrate non-limiting examples of such devices and components thereof. While mobile information handling devices such as tablet computers, laptop computers, and smartphones have been specifically mentioned as examples herein, embodiments may be implemented using other systems or devices as appropriate.

As will be appreciated by one skilled in the art, various aspects may be embodied as a system, method or computer (device) program product. Accordingly, aspects may take the form of an entirely hardware embodiment or an embodiment including software that may all generally be referred to herein as a "circuit," "module" or "system." Furthermore, aspects may take the form of a computer (device) program product embodied in one or more computer (device) readable medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device comprising:
   one or more processors;
   a memory operatively coupled to the one or more processors;
      wherein, responsive to execution of program instructions stored in said memory, the one or more processors:
         identify a connection between the information handling device and one or more external systems;
         obtain one or more physical measurements of the information handling device using one or more physical characteristic measurement elements; and
         responsive to the one or more physical measurements matching one or more disconnection policy settings, wherein the one or more disconnection policy settings comprises movement of the information handling device exceeding a predetermined time frame and an acceleration of the information handling device exceeding a predetermined value, terminate the connection between the information handling device and the one or more external systems.

2. The information handling device according to claim 1, wherein the one or more physical measurements comprise a location of the information handling device.

3. The information handling device according to claim 2, wherein the location of the information handling device comprises a geographic location.

4. The information handling device according to claim 1, wherein the one or more processors prompt a user to maintain or terminate the connection between the information handling device and an external system.

5. The information handling device according to claim 1, wherein the one or more policy settings comprises movement of the information handling device outside of a specified geographic location.

6. A method comprising:
   obtaining one or more physical measurements of an information handling device having a connection to one or more external systems, the one or more physical measurements being measured using one or more physical characteristic measurement elements; and
   responsive to the one or more physical measurements matching one or more disconnection policy settings, wherein the one or more disconnection policy settings comprises movement of the information handling device exceeding a predetermined time frame and an acceleration of the information handling device exceeding a predetermined value terminating the connection between the information handling device and the one or more external systems.

7. The method according to claim 6, wherein the one or more physical measurements comprise a location of the information handling device.

8. The method according to claim 7, wherein the location of the information handling device comprises a geographic location.

9. The method according to claim 6, further comprising prompting a user to maintain or terminate the connection between the information handling device and an external system.

10. A program product comprising:
    a storage device having program code embodied therewith, the program code comprising:
       program code that obtains one or more physical measurements of an information handling device having a connection to one or more external systems, the one or more physical measurements being measured using one or more physical characteristic measurement elements; and
       program code that, responsive to the one or more physical measurements matching one or more disconnection policy, wherein the one or more disconnection policy settings comprises movement of the information handling device exceeding a predetermined time frame and an acceleration of the information handling device exceeding a predetermined value, terminates the connection between the information handling device and the one or more external systems.

11. An information handling device of claim 1, wherein the information handling device comprises a mobile information handling device.

12. An information handling device of claim 1, wherein to connect comprises a connection using a long-range wireless communication protocol.

* * * * *